United States Patent [19]

Cordes et al.

[11] 4,064,103
[45] Dec. 20, 1977

[54] POLYBUTYLENE TEREPHTHALATE MOLDING COMPOSITIONS WHICH ARE RESISTANT TO HEAT-AGING

[75] Inventors: Claus Cordes, Weisenheim; Hans-Josef Sterzel, Dannstadt-Schauernheim, both of Germany

[73] Assignee: BASF Aktiengesellschaft, Ludwigshafen, Germany

[21] Appl. No.: 677,921

[22] Filed: Apr. 19, 1976

[30] Foreign Application Priority Data

May 23, 1975  Germany .............................. 2522901

[51] Int. Cl.$^2$ ............................................ C08K 5/29
[52] U.S. Cl. .............................................. 260/45.9 D
[58] Field of Search ................................. 260/45.9 DI

[56] References Cited

U.S. PATENT DOCUMENTS

| | | | |
|---|---|---|---|
| 3,193,523 | 7/1965 | Neumann et al. | 260/45.9 DI |
| 3,547,873 | 12/1970 | Weissermel et al. | 260/40 |
| 3,956,214 | 5/1976 | Tate et al. | 260/34.2 |

OTHER PUBLICATIONS

Modern Plastics Encyclopedia — 1974–1975, pp. 500 and 502.

*Primary Examiner*—V.P. Hoke
*Attorney, Agent, or Firm*—Keil, Thompson & Shurtleff

[57] ABSTRACT

Stabilized polyester molding compositions in which the stabilizer is a carbodiimide of the formula

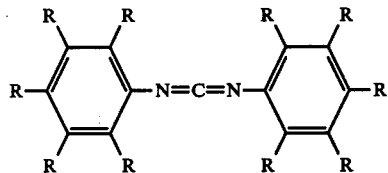

where R is hydrogen, alkyl, halogen or nitro, at least one of the substituents R in the ortho-position to the carbodiimide group must differ from hydrogen, and the carbodiimide molecule contains, as substituents R, 2 alkyl groups and 2 nitro groups, or from 4 to 6 chlorine atoms, or 2 alkyl groups and from 4 to 6 chlorine atoms, or 2 chlorine atoms and 2 nitro groups, or 4 chlorine atoms and 2 bromine atoms.

2 Claims, No Drawings

POLYBUTYLENE TEREPHTHALATE MOLDING COMPOSITIONS WHICH ARE RESISTANT TO HEAT-AGING

The invention relates to thermoplastic molding compositions based on polybutylene terephthalate and having improved properties, in particular increased toughness, resistance to heat-aging and stability during processing.

Thermoplastic polyesters based on polybutylene terephthalate are increasing in importance as raw materials for the manufacture of moldings. This is because polybutylene terephthalate has substantial advantages, as a molding composition, over other thermoplastic polyesters, eg. polyethylene terephthalate. Specifically, polybutylene terephthalate can be processed substantially more simply by injection molding than can polyethylene terephthalate; even at low mold temperatures, of from about 30° to 60° C, polybutylene terephthalate can be processed with short cycle times to give highly crystalline and hence dimensionally stable moldings. Because of the high speed of crystallization even at low temperatures, mold release presents no problems. The dimensional stability of polybutylene terephthalate injection moldings is furthermore very good even at temperatures around, and substantially above, the glass transition temperature of polybutylene terephthalate.

It is also known to incorporate glass fibers into polybutylene terephthalate, whereby particularly the rigidity, the strength and the heat distortion point are raised.

However, polybutylene terephthalate molding compositions suffer from inadequate stability to heat-aging.

It has already been disclosed that the resistance to heat-aging of polybutylene terephthalate can be improved by adding stabilizers. Further, German Published Application No. 1,770,495 discloses that aromatic polycarbodiimides of the formula

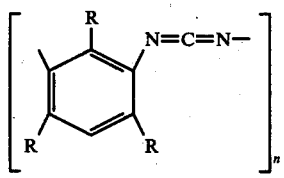

where R is hydrogen or alkyl of 1 to 4 carbon atoms and n is an integer from 2 to 20, greatly reduce the thermal degradation of polyethylene glycol terephthalates.

However, the carbodiimides described in German Published Application No. 1,770,495 are immiscible with polybutylene terephthalate. As a result, the polycarbodiimides must be incorporated by using mixing extruders which are fitted with kneading elements which produce intense shearing forces, in order to ensure sufficiently fine distribution of the stabilizer in the polyester. Successful stabilization of the polyester is only achieved if the stabilizer is very finely distributed therein. However, the high shearing forces required for the admixture of the stabilizer cause mechanical-thermal degradation of the polyester, which in particular reduces the impact strength of the latter. A further disadvantage resulting from the incompatibility of these polycarbodiimides with polyesters is that the polycarbodiimides migrate out of molded articles, particularly at high temperatures. This reduces the stabilizing action and causes a deterioration of the electrical properties, eg. of the tracking resistance.

It is an object of the present invention to provide stabilizers which, whilst having an equally good stabilizing action in polybutylene terephthalate, do not suffer from the disadvantages of the prior art, described above.

We have found that this object is achieved with polyester molding compositions, especially polybutylene terephthalate molding compositions, stabilized with carbodiimides, wherein the carbodiimides are compounds of the formula

where at least one of the substituents R in the ortho-position to the carbodiimide group must differ from hydrogen, and the carbodiimide molecule contains, as substituents R, 2 alkyl groups and 2 nitro groups, or from 4 to 6 chlorine atoms, or 2 chlorine atoms and 2 nitro groups, or 4 chlorine atoms and two bromine atoms, or 2 alkyl groups and from four to six chlorine atoms, the remaining substituents R being in each case hydrogen, and the upper limit for the carbon atoms content in the alkyl groups being preferably 4. Such carbodiimides are soluble in polyesters and exhibit an excellent stabilizing action.

The carbodiimides to be added according to the invention may be manufactured by conventional methods of organic chemistry. The correspondingly substituted aromatic amines are used as starting materials and are converted, in a suitable solvent, to the hydrochlorides by means of hydrogen chloride. The hydrochlorides are then converted to the corresponding isocyanates by means of phosgene. The isocyanates are then purified, preferably by distillation at subatmospheric pressure, after which they are converted to the corresponding carbodiimides. The reaction of the isocyanates to give the carbodiimides is described, eg., in Sandler and Karo, Organic Functional Group Preparation, Academic Press 1971, Vol. II, page 212. The catalysts used are phospholine oxides, in particular 1-ethyl-3-methyl-3-phospholine 1-oxide. The isocyanate is fused and about 0.1 percent by weight of the catalyst is admixed. The reaction commences immediately, with evolution of carbon dioxide. After from 2 to 15 minutes, the reaction mixture solidifies and the last traces of carbon dioxide are removed at subatmospheric pressure. The carbodiimide thus obtained is ground and can then be mixed with the polyester. The admixture, to the polyester, of the carbodiimides to be added according to the invention may be effected in various ways:

The carbodiimides may be added during the melt polycondensation. In a preferred embodiment, the carbodiimides according to the invention are added to the polycondensation batch when the melt has already reached a relative viscosity of from 1.05 to 1.1, and condensation is then continued until the desired final viscosity is reached.

In a particularly preferred embodiment, only a small proportion of the polyester composition which is to be stabilized, eg. only from 5 to 10 percent by weight thereof, is mixed with from 10 to 20 times the amount of stabilizer required (for this proportion of the polyester).

Mixing devices which may be used for this purpose are single-screw extruders, twin screw extruders or other dynamic mixing apparatus. The mixture thus obtained is now mixed with the remainder of the polyester. For this purpose, static mixers, of which various embodiments are described in numerous publications in the literature, may be used. In addition to their high safety of operation and low operating costs, such mixing devices, eg. Kenics or ISG, have the advantage over others that during the mixing process, which comprises dividing, redirecting and recombining melt streams, the shearing forces which arise are low and hence no mechanical-thermal degradation of the melt occurs. In this embodiment, only a small part of the polyester melt is subjected to shearing forces during mixing with the stabilizer. However, the shearing forces can be low, since the good solubility of the carbodiimides of the invention ensures rapid distribution in the polyester. Such a gentle process for incorporating carbodiimides in polyester melts in only feasible with carbodiimides which even in substantial amounts are soluble in the melts. Since very little in the way of shearing forces is produced during the process of incorporating the carbodiimides in the polyester melt, the latter does not suffer any mechanical-thermal degradation and, in particular, possesses greater impact strength than prior art material.

The polybutylene terephthalate molding compositions of the invention are distinguished by substantially better heat-aging resistance than that of the unmodified polybutylene terephthalate compositions, so that their sustained use temperature is from about 10° to 20° C higher and accordingly values of from 120° to 130° C are achieved.

Migration of the carbodiimides of the invention out of moldings at a higher temperature, as is found with polycarbodiimides having only isopropyl substituents, is thus prevented.

Polybutylene terephthalate, a polyester of terephthalic acid and 1,4-butanediol, is known. It is preferably manufactured by trans-esterification of a dialkyl terephthalate or diaryl terephthalate (especially dimethyl terephthalate) with 1,4-butanediol, followed by condensation in the presence of suitable catalysts. Polybutylene terephthalate has a melting point of about 222° C. Preferably, this polyester is injection-molded at melt temperatures of from 230° to 275° C.

As a rule, the polybutylene terephthalate employed to manufacture the molding compositions of the invention has a relative viscosity of from 1.3 to 1.8, preferably from 1.5 to 1.7. The relative viscosity was determined in an 0.5 percent strength solution in a phenol/o-dichlorobenzene (3:2 w/w) mixture at 25° C.

The thermoplastic molding compositions contain polybutylene terephthalate which may be modified with up to 20 mole percent of other dicarboxylic acids or other alcohols. Examples of possible modifiers are aliphatic, cycloaliphatic or aromatic dicarboxylic acids, eg. adipic acid, azelaic acid, sebacic acid, dodecanedicarboxylic acid, cyclohexanedicarboxylic acid, isophthalic acid or naphthalenedicarboxylic acid. Alcoholic modifiers employed may in particular be aliphatic and cycloaliphatic glycols of from 2 to 10 carbon atoms, eg. ethylene glycol, propylene glycol, hexamethylene glycol, neopentyl glycol and diethylene glycol.

The polybutylene terephthalate injection-molding compositions of the invention may optionally be modified with up to 30%, based on the polyester, of other thermoplastics, eg. polyamides and/or polycarbonates, eg. polyamides and/or polycarbonates and/or polyolefins and/or polytetrafluoroethylene and/or polyoxymethylene and/or polyphenylene oxide and/or copolymers of ethylene and acrylic acid and/or copolymers of ethylene and methyl acrylate, and/or thermoplastic polyurethanes.

EXAMPLES

In the Examples which follow, the compounds

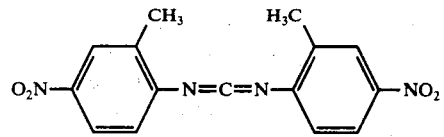

2,2'-dimethyl-4,4'-dinitrodiphenylcarbodiimide

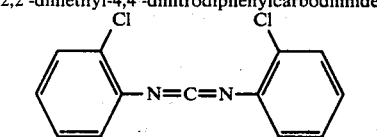

2,2',6,6'-tetrachlorodiphenylcarbodiimide

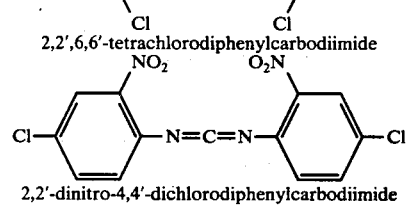

2,2'-dinitro-4,4'-dichlorodiphenylcarbodiimide are compared with the polycarbodiimide of the formula

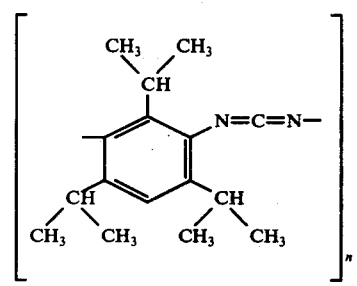

Compounds A to D were admixed in amounts of 0.5 percent by weight to a polybutylene terephthalate having a relative viscosity of 1.66.

Compounds A, B and C were mixed with polybutylene terephthalate, in a weight ratio of 1:9, by means of a type ZDSK 28 twin-screw extruder at 240° C. It proved impossible to prepare a mixture with compound D by this method since the compound was immiscible with the polyester and the strand split at the extruder die.

It was found that the mixtures of the compounds A, B and C with the polybutylene terephthalate could be mixed, without difficulty, with the main part of the polybutylene terephthalate, in a weight ratio of 1:19, by means of a Kenics static mixer, thereby giving the stated carbodiimide content of 0.5% by weight.

Compound D was directly mixed, in an amount of 0.5 percent by weight, with polybutylene terephthalate in a type ZDSK extruder.

Bars of size 4× 6× 50 mm were produced from the mixtures on an injection-molding machine, using a material temperatur of 255° C and a mold temperature of 60° C. To determine the resistance to heat-aging, the test specimens were stored at 140° C in a throughcirculation drying cabinet and the decrease in impact strength was tested after various times. The impact strength is very sensitive to degradation of molecular weight by heat-aging. The impact strength test was based on DIN 53,453, with the modification that a 3 mm diameter hole was drilled in the center of the 6 × 50 mm surface of the test bars, so as to produce a double notch. The perforation-type notched impact strength $a_{LK}$ was then measured, in kilojoule/m², by means of a pendulum-type impact tester. The specimen is struck in the lengthwise direction of the hole; the notching effect acts on both sides. This test permits precise differentiation of the impact strength of the test specimens.

The measurements listed in Table 2, which follows, show the superiority of the carbodiimides of the invention over the polycarbodiimide D, which is insoluble in polybutylene terephthalate.

The comparative sample consisted of polybutylene terephthalate which had been processed on a type ZDSK 28 extruder at 240° C under the same conditions as in the experiment with polycarbodiimide D, but without any additive.

TABLE 2

|  | notched impact strength, kilojoule/m² | | | | |
|---|---|---|---|---|---|
| Storage time in days at 140° C | perforation-type | | | | unstabilized polybutylene terephthalate |
|  | 0.5% A | 0.5% B | 0.5% C | 0.5% D |  |
| 0 | 55 | 60 | 52 | 42 | 38 |
| 6 | 50 | 56 | 47 | 40 | 25 |
| 11 | 48 | 54 | 47 | 40 | 19 |
| 17 | 50 | 55 | 46 | 35 | 16 |
| 21 | 47 | 52 | 44 | 34 | 14 |
| 26 | 45 | 50 | 42 | 34 | 12 |
| 31 | 44 | 46 | 42 | 33 | 11 |
| 38 | 40 | 42 | 37 | 30 | 10 |
| 45 | 37 | 38 | 33 | 27 | 8 |
| 54 | 38 | 36 | 32 | 24 | 6 |

We claim:

1. A stabilized polybutylene terephthalate molding composition wherein the stabilizer is a carbodiimide selected from the group consisting of 2,2'-dimethyl-4,4'-dinitrodiphenylcarbodiimide, 2,2',6,6'-tetrachlorodiphenylcarbodiimide and 2,2'-dinitro-4,4'-dichlorodiphenylcarbodiimide, and the amount of said carbodiimide is from 0.1 to 5 percent by weight, based on polybutylene terephthalate.

2. A polybutylene terephthalate molding composition as set forth in claim 1, in which the amount of carbodiimide is from 0.2 to 2 percent by weight, based on polybutylene terephthalate.

* * * * *